United States Patent [19]
Cullen

[11] Patent Number: 5,832,721
[45] Date of Patent: Nov. 10, 1998

[54] METHOD AND SYSTEM FOR ESTIMATING A MIDBED TEMPERATURE OF A CATALYTIC CONVERTER IN AN EXHAUST SYSTEM HAVING A VARIABLE LENGTH EXHAUST PIPE

[75] Inventor: Michael John Cullen, Northville, Mich.

[73] Assignee: Ford Global Technologies, Inc., Dearborn, Mich.

[21] Appl. No.: 828,025

[22] Filed: Mar. 27, 1997

Related U.S. Application Data

[63] Continuation-in-part of Ser. No. 731,421, Oct. 15, 1996.

[51] Int. Cl.$^6$ ........................................... F01N 3/00
[52] U.S. Cl. ................... 60/274; 60/289; 60/290; 60/286; 364/557
[58] Field of Search ............. 60/274, 286, 289, 60/290, 322; 364/557

[56] References Cited

U.S. PATENT DOCUMENTS

| | | | |
|---|---|---|---|
| 5,414,994 | 5/1995 | Cullen et al. | 60/274 |
| 5,610,844 | 3/1997 | Maus et al. | 364/557 |
| 5,701,735 | 12/1997 | Kawaguchi | 60/286 |
| 5,722,236 | 3/1998 | Cullen et al. | 60/274 |

*Primary Examiner*—Thomas E. Denion
*Attorney, Agent, or Firm*—Allan J. Lippa; Roger L. May

[57] ABSTRACT

A method and system for estimating the midbed temperature of a catalytic converter in an exhaust system of an internal combustion engine utilizes a sensor for a rotational speed of the engine and generating a corresponding speed signal. A control logic determines whether the exhaust gas is flowing through the short path or the long path, determines an instantaneous temperature of exhaust gas at a first point on the exhaust pipe based on the speed signal, and determines an instantaneous temperature at a midbed point of the catalytic converter based on the instantaneous temperature of exhaust gas at the first point on the exhaust pipe and which path the exhaust gas is flowing.

17 Claims, 5 Drawing Sheets

METHOD AND SYSTEM FOR ESTIMATING A MIDBED TEMPERATURE OF A CATALYTIC CONVERTER IN AN EXHAUST SYSTEM HAVING A VARIABLE LENGTH EXHAUST PIPE

CROSS-REFERENCE TO RELATED APPLICATION

This application is a continuation-in-part of U.S. patent application Ser. No. 08/731,421, filed Oct. 15, 1996, entitled "Method and System For Estimating a Midbed Temperature of a Catalytic Converter in an Exhaust System".

TECHNICAL FIELD

This invention relates to methods and systems for estimating a midbed temperature of a catalytic converter in an exhaust system having a variable length exhaust pipe.

BACKGROUND ART

An exhaust emission control apparatus typically includes a catalytic converter provided in an exhaust passage of an internal combustion engine to reduce the exhaust gas emissions produced by the engine. Such converters operate to chemically alter the exhaust gas composition produced by the engine to help meet various environmental regulations governing tailpipe emissions. Current methods of estimating the midbed temperature of a catalytic converter, however, fail to consider the effects of a variable length exhaust pipe.

Accordingly, there exists a need to accurately estimate the temperature of the midbed point of a catalytic converter taking into consideration the effect of a variable length exhaust pipe.

DISCLOSURE OF THE INVENTION

It is thus a general object of the present invention to provide a method and system for estimating the midbed temperature of a catalytic converter in an exhaust system having a variable length exhaust pipe.

In carrying out the above object and other objects, features, and advantages of the present invention a method is provided for estimating the midbed temperature of a catalyst in an exhaust system having a variable length exhaust pipe, including a short path and a long path for transporting exhaust gas from the engine to the catalytic converter and further having an exhaust valve positioned in the exhaust pipe for regulating the flow of exhaust gas between the short path and the long path. The method includes the step of sensing a rotational speed of the engine and generating a corresponding speed signal. The method also includes the step of determining whether the exhaust gas is flowing through the short path or the long path. Still further, the method includes the step of determining an instantaneous temperature of exhaust gas at a first point on the exhaust pipe based on the speed signal. Finally, the method includes the step of determining an instantaneous temperature at a midbed point of the catalyst based on the instantaneous temperature of exhaust gas at the first point on the exhaust pipe and which path the exhaust gas is flowing.

In further carrying out the above object and other objects, features, and advantages of the present invention, a system is also provided for carrying out the steps of the above described method. The system includes a sensor for sensing a rotational speed of the engine and generating a corresponding speed signal. The system further includes control logic operative to determine whether the exhaust gas is flowing through the short path or the long path, determine an instantaneous temperature of exhaust gas at a first point on the exhaust pipe based on the speed signal, and determine an instantaneous temperature at a midbed point of the catalyst based on the instantaneous temperature of exhaust gas at the first point on the exhaust pipe and which path the exhaust gas is flowing.

An article of manufacture for an exhaust system of an internal combustion engine is also provided for carrying out the above object and other objects, features, and advantages of the present invention. The article of manufacture comprises a computer storage medium having a computer program encoded therein for determining whether the exhaust gas is flowing through the short path or the long path, determining an instantaneous temperature of exhaust gas at a first point on the exhaust pipe based on the speed signal, and determining an instantaneous temperature at a midbed point of the catalyst based on the instantaneous temperature of exhaust gas at the first point on the exhaust pipe and which path the exhaust gas is flowing.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
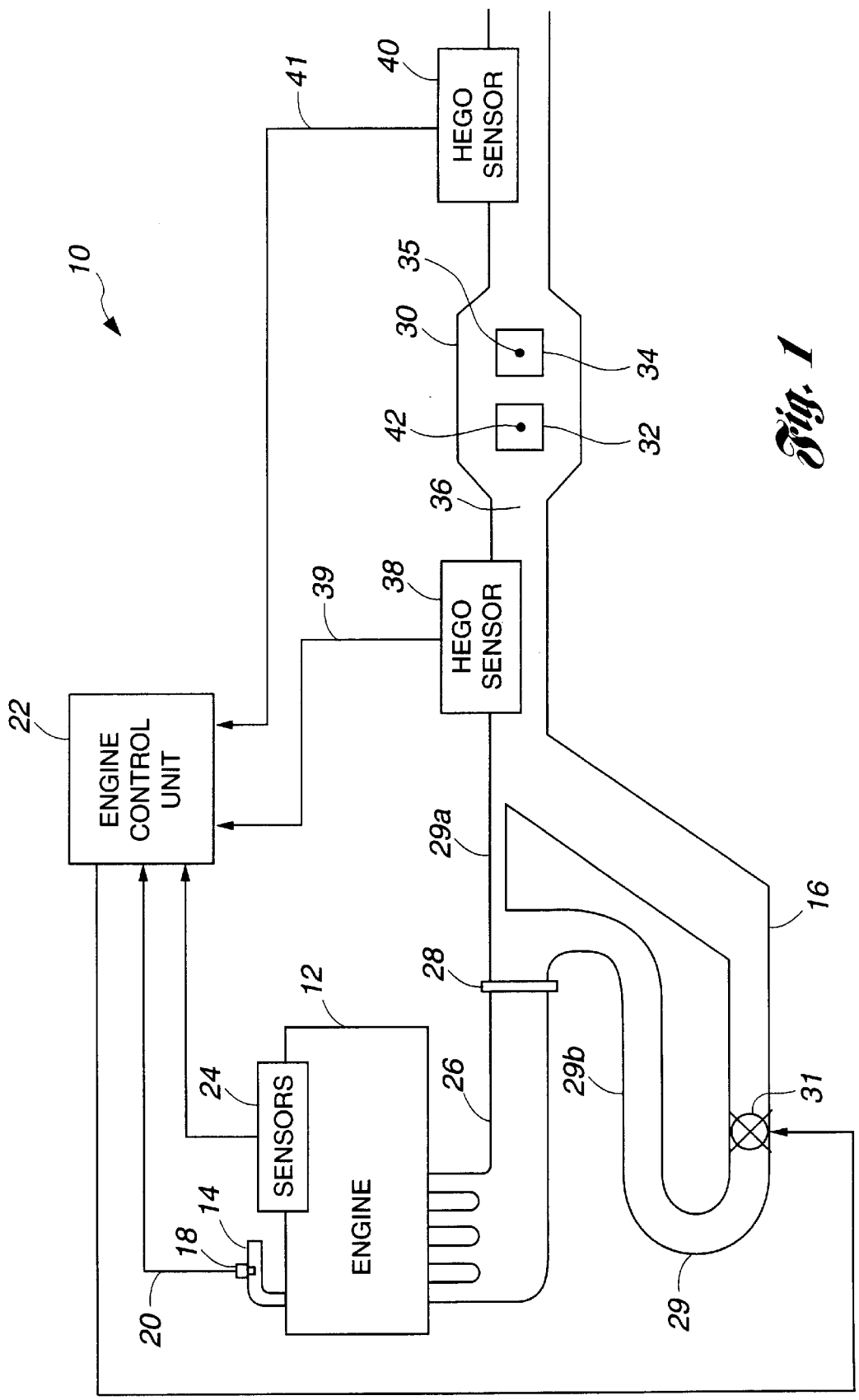
FIG. 1 is a schematic diagram of a vehicle engine and an electronic engine controller which embody the principles of the invention.

Turning now to FIG. 1, there is shown a schematic diagram of the system of the present invention, denoted generally by reference numeral 10. The system 10 includes an internal combustion engine 12 having an intake manifold 14 and an exhaust system 16. Positioned in the intake manifold 14 is a conventional mass air flow sensor 18 for detecting the amount of air inducted into the engine 12 and generating a corresponding air flow signal 20 for receipt by an Engine Control Unit (ECU) 22. The air flow signal 20 is utilized by the ECU 22 to calculate a value termed air mass (AM) which is indicative of a mass of air flowing into the induction system in lbs/min. Alternatively, a conventional manifold absolute pressure sensor (MAPS) may be used to calculate the AM. The air flow signal 20 is also used to calculate a value termed air charge (AIRCHG) which is indicative of air mass per cylinder filling, in units of lbs. per cylinder filling where a cylinder filling occurs once for each cylinder of the engine upon every two engine revolutions for a four-stroke engine. In another embodiment utilizing a two-stroke engine a cylinder filling occurs for each cylinder of the engine 12 upon every engine revolution.

The system 10 further includes other sensors, indicated generally at 24, for providing additional information about engine performance to the ECU 22, such as crankshaft position, angular velocity, throttle position, air temperature, engine coolant temperature, etc. The information from these sensors is used by the ECU 22 to control operation of the engine 12.

Figure 2:
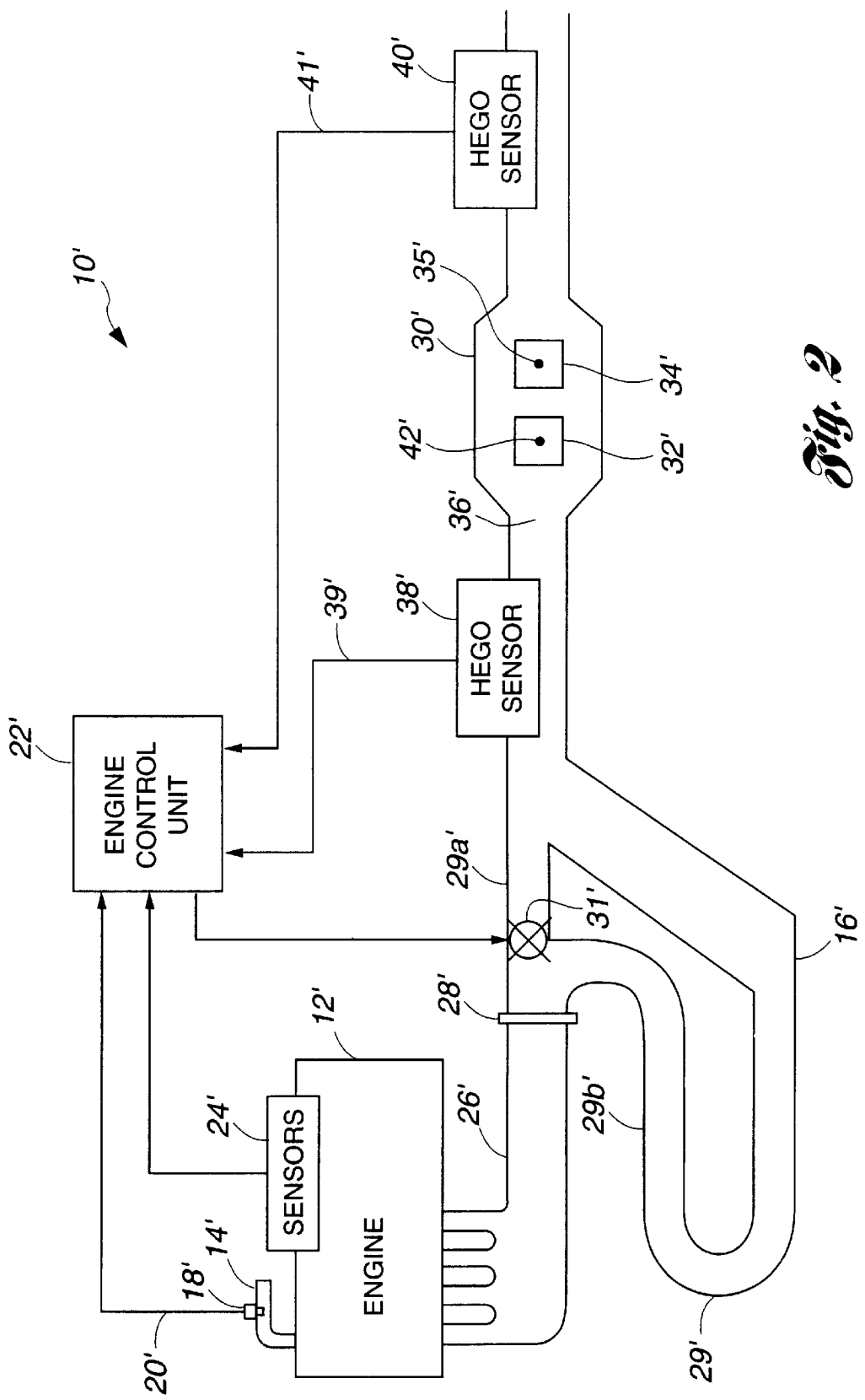
FIG. 2 is a schematic diagram of a second embodiment of the invention shown in FIG. 1.

The exhaust system 16 comprises an exhaust manifold 26, an exhaust flange 28, and a variable length exhaust pipe 29 which provides two paths 29a, 29b for exhaust gas flow. In the first embodiment, the short path 29a is always open. The long path 29b includes an Electronic Exhaust Length Control Valve (EELCV) 31 which is controlled by the ECU 22. At high air mass flow, the majority of exhaust gas flows through the path of least resistance, which is the larger diameter long path 29b. An alternative embodiment is shown in FIG. 2 in which the EELCV 31' is positioned so that it positively closes the short path 29a' when the long path 29b' is open. The embodiment shown in FIG. 1 may be preferred since the EELCV 31 is not positioned where it may be subjected to hot temperatures.

The exhaust system 16 transports exhaust gas produced from combustion of an air/fuel mixture in the engine 12 to an integrated three-way catalytic converter/nitrogen oxide ($NO_x$) trap canister 30. The canister 30 contains a catalyst substrate 32 which receives the exhaust gas produced by the engine 12 via an inlet 36 and then chemically alters the exhaust gas to generate an inert catalyzed exhaust gas. The canister 30 also contains a $NO_x$ trap substrate 34 for trapping $NO_x$ emitted by the engine 12. Alternatively, the $NO_x$ trap may be a separate canister (not shown) from the catalytic canister.

An upstream heated exhaust gas oxygen (HEGO) sensor 38, positioned upstream of the canister 30 on the exhaust system 16 of the engine 12, detects the oxygen content of the exhaust gas generated by the engine 12 and transmits a representative signal 39 to the ECU 22. A downstream HEGO sensor 40, positioned downstream of the canister 30, detects the oxygen content of the catalyzed exhaust gas and transmits a representative signal 41 to the ECU 22. Associated with each sensor 38 and 40 is a resistance heater for providing selective heating of sensors 38 and 40.

Typically, the catalyst 32 of the canister 30 experiences degradation when operated at a temperature greater than approximately 1800 degrees fahrenheit. A temperature at a midbed point, shown at 42, of the catalyst 32 is representative of the temperature of the catalyst 32 in the canister 30. The midbed point 42 is preferably located one inch from the initial point of contact of exhaust gas on the catalyst 32, at the axial centerline of the catalyst 32. Furthermore, a temperature at a midbed point 35 of $NO_x$ trap 34 is representative of the temperature of the $NO_x$ trap 34.

In a preferred embodiment, during engine operation, the temperature of the midbed point 42 is determined. The midbed temperature can be used in many applications, such as monitoring the catalytic converter for damage under the California Air Resources Board (CARB) On Board Diagnostic OBD-II regulations, limiting spark retard during traction control, providing an air/fuel ratio to meet a given exhaust temperature limit, etc.

Figure 3:
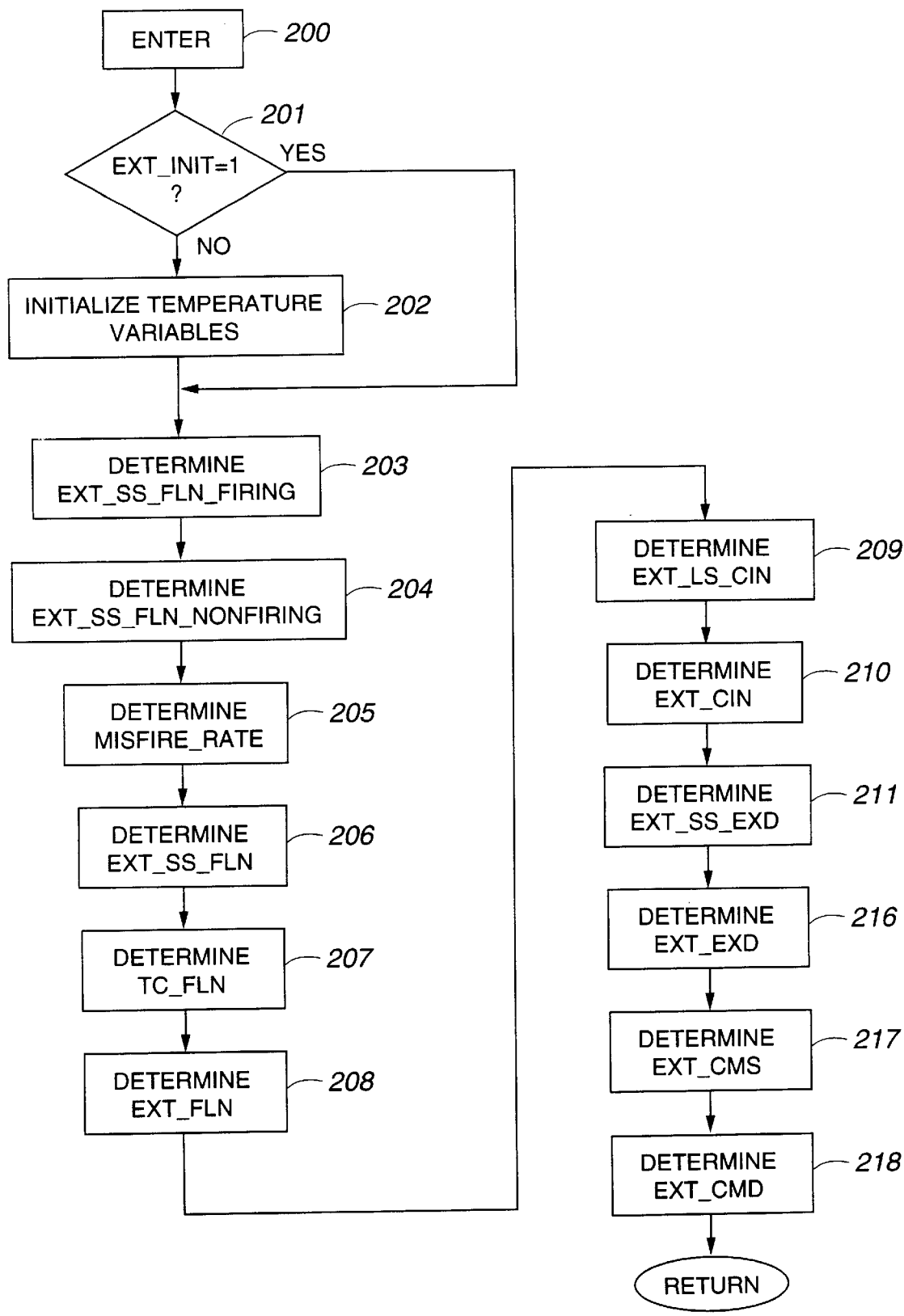
FIG. 3 is a flow diagram illustrating the general sequence of steps associated with the operation of the present invention.
Figure 5:
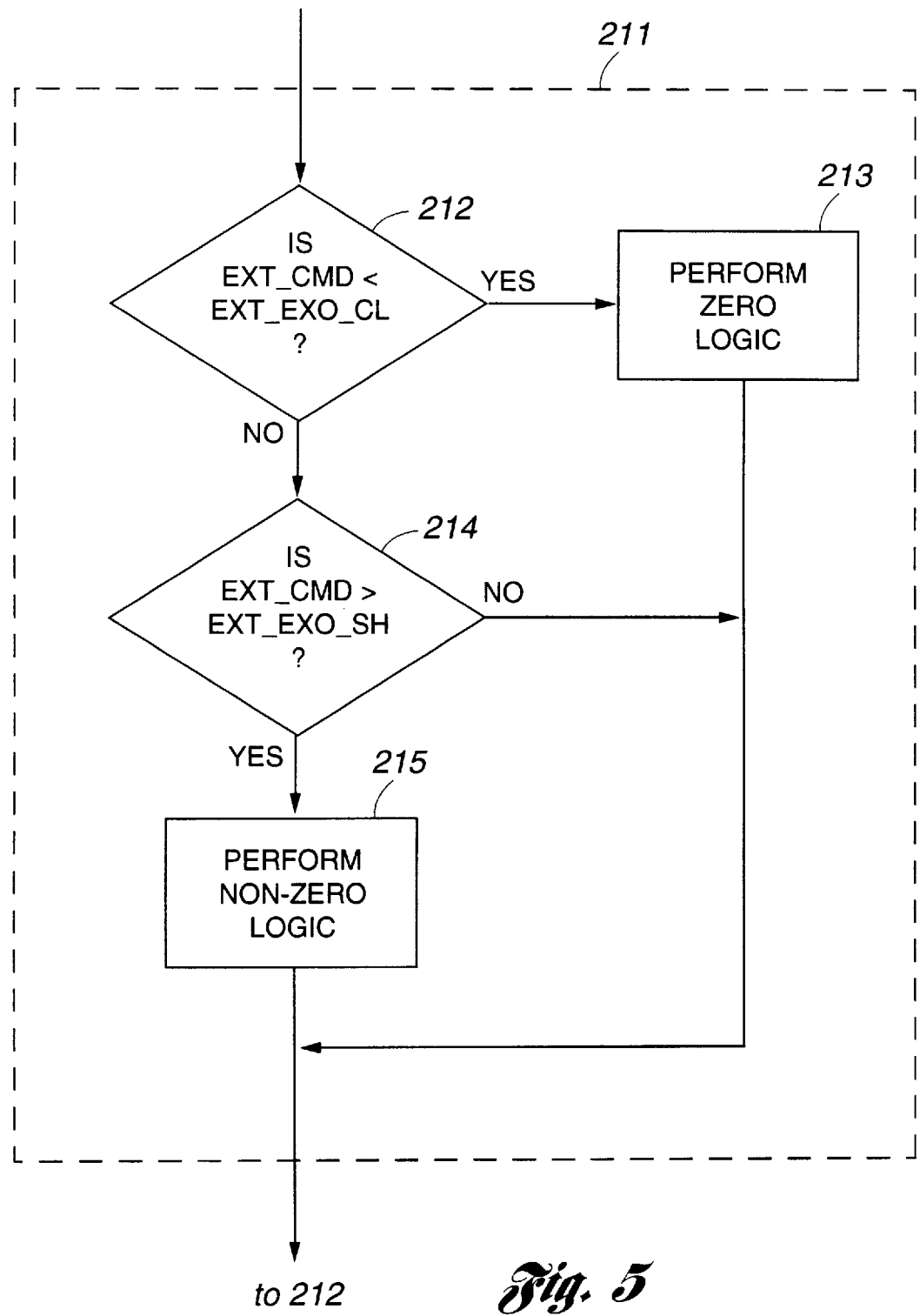
FIG. 5 is a flow diagram illustrating the steps associated with determining the steady state exotherm difference.

FIGS. 3 and 5 are flow diagrams showing the steps in a routine performed by a control logic, or the ECU 22. The ECU 22 may be comprised of hardware, software, or a combination thereof. Although the steps shown in FIGS. 3 and 5 are depicted sequentially, they can be implemented utilizing interrupt-driven programming strategies, object-oriented programming, or the like. In a preferred embodiment, the steps shown in FIGS. 3 and 5 comprise a portion of a larger routine which performs other engine control functions.

The midbed temperature determination routine is entered at 200 and at 201 an initialization flag EXT_INIT is checked to determine if certain temperature variables have been initialized. A preferred embodiment advantageously initializes certain temperature variables in a manner to account for instances where an engine may be turned off for short periods of time in which the catalytic converter may not have cooled to an ambient temperature. Catalytic converter over-temperature conditions are accordingly reduced by estimating converter temperature upon engine ignition as a function of converter temperature upon engine shut off, ambient temperature, a calibratable time constant indicative of converter cooling and the time elapsed from engine shut off to subsequent engine operation. EXT_INIT will be set to a value of zero when engine power is turned on so that the temperature variables may be initialized at 202. Once the variables are initialized, EXT_INIT is set to a value of one and remains at such a value until engine operation is terminated. At 202 a plurality of variables to be used in the temperature determination routine are initialized as shown below:

$$EXT\_FL=(EXT\_FL-INFAMB\_KAM)*FNEXP(-ENG\_OFF\_TMR/TC\_SOAK\_FL)+INFAMB\_KAM \quad (1)$$

$$EXT\_CMD=(EXT\_CMD-INFAMB\_KAM)*FNEXP(-ENG\_OFF\_TMR/TC\_SOAK\_CMD)+INFAMB\_KAM \quad (2)$$

$$EXT\_SS\_FLN=EXT\_FL \quad (3)$$

$$EXT\_INIT=1 \quad (4)$$

where:

EXT_FL is a value which is stored in the ECU 22 and which is indicative of an instantaneous temperature of exhaust gas at exhaust flange 28.

As can be seen from equations (1) and (2) above, if the engine has been turned off for a long period of time, ENG_OFF_TMR will contain a large value, the exponential function will result in the first additive term on the right hand side of the equation equalling zero, and the temperature of the catalyst midbed and exhaust flange will equal the ambient temperature. For shorter periods of time the exponential function FNEXP will approximate the cooling off of the catalyst midbed. Because EXT_FL is stored in the ECU 22, upon initialization EXT_FL will advantageously contain the temperature of exhaust gas at exhaust flange 28 when the engine was last turned off, ENG_OFF_TMR is a variable which indicates the time, in seconds, that the engine has been turned off, TC_SOAK_FL is a calibratable time constant, in seconds, associated with the cooling off of exhaust gas at the exhaust flange 28 when the engine is turned off, FNEXP() is a look-up table stored in the ECU 22 which approximates an exponential function for use by a fixed point processor in the ECU 22, EXT_CMD is an instantaneous temperature value at midbed point 42 of the catalyst 32, ENG_OFF_TMR is as previously described, TC_SOAK_CMD is an empirically derived time constant, in seconds, of the cooling off of exhaust gas at the catalyst midbed, and INFAMB_KAM is a value indicative of an estimate of ambient air temperature in degrees fahrenheit, which may be estimated utilizing a temperature sensor.

At 203 a steady state temperature value indicative of a steady state temperature of the exhaust flange 28 when the engine 12 is firing is determined according to the method disclosed in U.S. Pat. No. 5,414,994, issued to Cullen et al., which is hereby incorporated by reference in its entirety. The steady state temperature of the exhaust flange 28 is determined according to the following relationship:

$$EXT\_SS\_FLN\_FIRING=FN4441(N, AIRCHG)*FN441A(LAMBSE)*FN441B(SPK\_DELTA)*FN441C(EGRACT)+[FN441T(AM)*(ECT-200)] \quad (5)$$

where:

FN4441(N,AIRCHG) is an empirically derived value, contained in a table indexed by engine speed, N, and air charge, AIRCHG, which is indicative of a base steady-state exhaust flange temperature, in degrees fahrenheit at a particular engine speed and air charge at an air/fuel ratio (A/F) of 14.6 A/F, 0% exhaust gas recirculation (EGR), maximum spark for best torque, and 200 degrees fahrenheit engine coolant temperature (ECT), FN441A(LAMBSE) is a value contained in a table, and indexed by air/fuel modulation variable LAMBSE, which is indicative of the effect of LAMBSE on exhaust flange temperature, FN441B(SPK_DELTA) is a value, contained in a table indexed by a spark delta, in crank angle degrees which is indicative of an effect of spark timing on the exhaust flange temperature, FN441C(EGRACT) is a value, contained in a table indexed by level of exhaust gas recirculation, which is indicative of the effect of exhaust gas recirculation on the exhaust flange temperature, and FN441T(AM) is a value, indexed by air mass, AM, which is indicative of a reduction in exhaust flange temperature per degree of engine coolant temperature below 200 degrees fahrenheit.

At 204 a steady state temperature value indicative of a steady state temperature of the exhaust flange 28 due to non-firing of the engine 12 is determined according to the following relationship:

$$EXT\_SS\_FLN\_NONFIRING=(ACT+ECT)/2 \quad (6)$$

where:

ACT is a value indicative of a temperature of the airflow into the engine 12, and ECT is a value indicative of the engine coolant temperature.

At 205 a value indicative of the average rate of misfires per cylinder filling is determined. The speed of the engine is measured very precisely using the crankshaft position sensor (not shown). In the event of a misfire, the momentum, which is normally produced by the combustion, is lacking. Thus, abnormal variations of speed changes at steady state conditions may be considered as a misfire. In the preferred embodiment, the estimated rate of misfires is determined according to the following relationship:

$$MISFIRE\_RATE=[FK*B*(A/B-MISFIRE\_RATE(old)]+MISFIRE\_RATE(old) \quad (7)$$

where:

A is a value indicative of the incremental number of misfires since the last update, B is a value indicative of the incremental number of cylinder fillings since the last update, MISFIRE_RATE(old) is a value indicative of the average misfire rate determined during the last update, and FK is a filter constant that is progressively weighted by the total number of cylinder events tested, with upper and lower clips BETAMISHI and BETAMISLO, respectively, and is determined according to the following relationship:

$$FK=1/(\# \text{ of events since engine started}) \quad (8)$$

Equation 8 allows an instantaneous average at initial start-up to be determined, and then switch over to a rolling average as time progresses. For instance, setting BETAMISHI=1.0 allows the misfire rate calculation to jump to the instantaneous average value on the first update. As the total number of events tested increases, the filter constant decreases inversely and continues to calculate a true average misfire rate. When the filter constant hits the lower clip BETAMISLO, the calculation becomes a rolling average in that the misfire rate covers a sliding window spanning the last 1/BETAMISLO events.

At 206 a steady state temperature value indicative of a steady state temperature of the exhaust flange 28 due to both firing and non-firing of the engine 12 is determined according to the following relationship:

$$EXT\_SS\_FLN=MISFIRE\_RATE*EXT\_SS\_FLN\_NONFIRING+(1-MISFIRE\_RATE)*EXT\_SS_{FLN}\_FIRING \quad (9)$$

At 207 a time constant TC_FLN, which is indicative of a temperature rise of the exhaust flange 28, is calculated as a function of AM into the system 10 according to the following relationship:

$$TC\_FLN=FNxx1(AM) \quad (10)$$

where, FNxx1(AM) is a value obtained from a table, indexed by AM, as previously described, and is indicative of a time constant, in seconds, of the rise in exhaust flange temperature due to a step change in instantaneous predicted exhaust flange temperature versus air mass. This time constant is associated with the heat capacity of the metal from the combustion chamber to the exhaust flange 28.

At 208, an instantaneous value of the exhaust flange, EXT_FLN, is then calculated as a function of the steady state exhaust flange temperature, EXT_SS_FLN, the time constant of the temperature rise, TC_FLN, and the time required for execution of the background loop, BG_TMR, according to the following relationships:

$$EXT\_FLN=[(1-FK)*EXT\_FLN(old)]+FK*EXT\_SS\_FLN \quad (11)$$

where, FK performs an exponential smoothing function according to the following relationship:

$$FK=1/[1+(TC\_FLN/BG\_TMR)] \quad (12)$$

Figure 4:
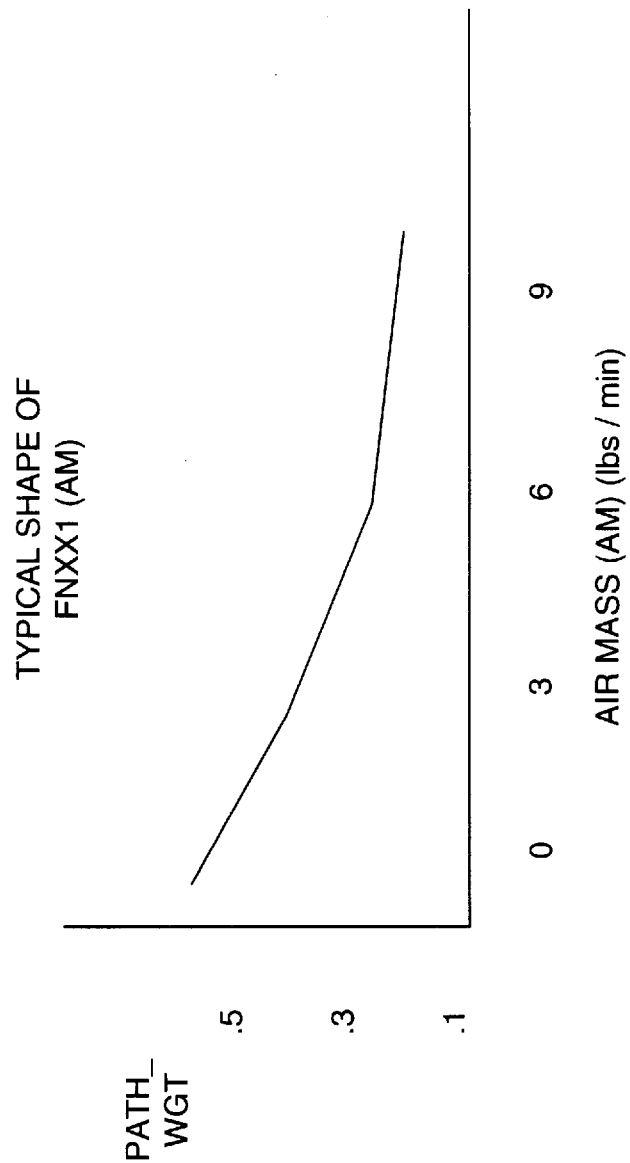
FIG. 4 is a graph illustrating the relationship between the mass of air flow and the flow of exhaust gas.

A steady state temperature drop, EXT_LS_CIN, between the exhaust flange 28 and the exhaust gas inlet 36 of the catalytic converter 30 is calculated at step 209. Before the steady state temperature drop can be calculated, it must be determined which path of the exhaust pipe 29 the exhaust gas is flowing. When the short path is open, exhaust gas flows through the short path entirely. When the long path is open, some flow of exhaust gas goes through the long path as well as the short path. The proportion going through the short or long path is a function of the air mass flow, AM, and is captured in a calibratable function, FNXX1(AM) as shown in FIG. 4. The status of the EELCV 31 is indicated by a flag EXT_EELCV_FLG where the value 1 indicates the valve 31 is set so the short loop is being utilized. Thus, if the EXT_EELCV_FLG is set to 1, then all flow is through the short path, and a value of 1 is assigned to a variable, path_wgt. If the EXT_EELCV_FLG is not set to 1, the path_wgt corresponds to FNXX1(AM), as discussed above. If the valve 31 is positioned in the exhaust pipe 29 so that it positively closes the short path when the long path is open, as shown in FIG. 2, then the variable path_wgt is assigned either the value 0 or 1 as described above.

Thus, the steady state temperature drop, EXT_LS_CIN, is determined according to the following relationship:

$$EXT\_LS\_CIN = fn442\_tmp * DELTA\_T \tag{13}$$

where, fn442_tmp is a value indicative of a temperature drop between exhaust flange 28 and catalyst inlet 36 as a function of AM and path_wgt. This temperature drop is determined according to the following relationship, $$fn442\_tmp = path\_wgt * fn442\_short(AM) + (1 - path\_wgt) * fn442\_long(AM), \tag{14}$$

where, fn442_short (AM) is a calibratable function representing the temperature drop from the exhaust flange 28 to catalyst inlet 36 via short path 29a expressed in units of degrees of actual temperature drop per degrees of potential temperature drop, and fn442_long(AM) is a calibratable function representing the temperature drop from the exhaust flange 28 to catalyst inlet 36 via the long path 29b expressed in units of degrees of actual temperature drop per degrees of potential temperature drop, and DELTA_T is a value which is indicative of a potential temperature difference in degrees fahrenheit between ambient temperature and the average exhaust gas temperature in the exhaust pipe between the exhaust flange 28 and the catalyst inlet 36.

DELTA_T is preferably calculated according to the following relationship:

$$DELTA\_T = AVG\_T - INFAMB\_KAM \tag{15}$$

where,

INFAMB_KAM is as previously described, and

AVG_T is a value indicative of an average value of exhaust gas temperature from the exhaust flange 28 to the catalyst inlet 36 of the catalytic converter 30.

AVG_T is preferably calculated according to the following relationship:

$$AVG\_T = (EXT\_FL + EXT\_CIN)/2 \tag{16}$$

where,

EXT_FLN is as previously described, and

EXT_CIN is a value indicative of the temperature of the exhaust gas at the catalyst inlet 36 of the catalytic converter 30.

The value contained in EXT_CIN is calculated in a manner to be described below. As can be seen from FIG. 3, in a preferred embodiment, a value of EXT_CIN which was calculated upon the prior execution of the steps in FIG. 3 is used in equation (16) above.

The temperature value, EXT_CIN, is calculated at step 210 as a function of the instantaneous temperature of the exhaust flange 28, EXT_FL, and of the steady state temperature drop between the exhaust flange 28 and the exhaust gas inlet 36, EXT_LS_CIN, as shown below:

$$EXT\_CIN = EXT\_FLN - EXT\_LS\_CIN \tag{17}$$

At 211, a value EXT_SS_EXD, which is indicative of the difference in temperature at the current air/fuel and misfire rate and the stoichiometric air/fuel and zero misfires of the exhaust gas in the catalyst 32 due to the exothermic reaction of the exhaust gas with the catalyst 32 is calculated based on a determination of whether or not the catalyst 32 has lit off.

The determination of the temperature value of the steady state exotherm difference is further illustrated in FIG. 5. If the temperature of the midbed point 42 of the catalyst 32, EXT_CMD, is less than a clear low (CL) value, EXT_EXO_CL, a zero logic is performed, as shown at 212 and 213, respectively. The value contained in EXT_CMD is calculated in a manner to be described below. As can be seen from FIG. 3, in a preferred embodiment, a value of EXT_CMD, which was calculated upon the prior execution of the steps in FIG. 3, is used here. The temperature value of the steady state exotherm difference is then calculated according to the following relationship:

IF (EXT_CMD<EXT_EXO_CL)
THEN $$EXO\_AT\_STOIC = 0 \tag{18}$$

$$EXT\_SS\_CMS = EXT\_CIN \tag{19}$$

$$EXT\_SS\_EXD = 0 \tag{20}$$

where,

EXT_CMD is as previously described,

EXT_EXO_CL is a calibratable clear low value, e.g., 400 degrees fahrenheit, indicative of the temperature below which the catalyst 32 is not lit off, EXO_AT_STOIC is a value indicative of the exotherm temperature at stoichiometric air/fuel, EXT_SS_CMS is a value indicative of the steady state temperature of the midbed point 42 of the catalyst 32 at stoichiometric air/fuel, EXT_CIN is as previously described, and EXT_SS_EXD is a value indicative of the temperature of the steady state exotherm difference.

If the temperature of the midbed point 42 of the catalyst 32, EXT_CMD, is greater than a set high (SH) value, EXT_EXO_SH, a non-zero logic is performed, as shown at 214 and 215, respectively, and calculated according to the following relationship:

IF (EXT_CMD>EXT_EXO_SH)
THEN $$EXO\_AT\_STOIC = FN448A(1) \tag{21}$$

$$EXT\_SS\_CMS = EXO\_AT\_STOIC + EXT\_CIN \tag{22}$$

$$EXT\_SS\_EXO = FN448A(LAMBSE) + MISFIRE\_RATE * FNxx2(AM) \tag{23}$$

$$EXT\_SS\_EXD = EXT\_SS\_EXO - EXO\_AT\_STOIC \tag{24}$$

where,
- EXT_EXO_SH is a calibratable set high value, e.g., 500 degrees fahrenheit, indicative of the temperature above which the catalyst 32 begins to light off,
- FN448A(1) is the value of the exotherm at an equivalence ratio of one which corresponds to stoichiometric air/fuel,
- EXT_SS_EXO is a value indicative of the increase in temperature of the exhaust gas in the catalyst 32 due to the exothermic reaction of the exhaust gas with the catalyst 32,
- FN448A(LAMBSE) is a predetermined value, in degrees fahrenheit, indicative of a steady-state increase in exhaust temperature in the catalyst, and is stored as a function of LAMBSE,
- MISFIRE_RATE is as previously described, and FNxx2 (AM) is the increase in exotherm per percent misfire as a function of air mass.

The determination of the temperature value of the steady state exotherm difference employs a hysteresis methodology. Once the catalyst 32 is lit off, it remains lit off until the catalyst midbed temperature falls below the CL value.

Returning now to FIG. 3, at 216 an instantaneous temperature value for exotherm difference is determined by first calculating a time constant value, TC_EXD, indicative of a temperature rise of the exhaust gas in the catalyst 32 in seconds according to the following relationship:

$$TC\_EXD=FN449A(AM) \qquad (25)$$

where,
- FN449A(AM) is a value obtained from a table, indexed by AM, and is indicative of a time constant, in seconds, of the rate of change in catalyst midbed temperature due to a step change in the exotherm versus air mass (AM).

The instantaneous temperature value EXT_EXD is then determined at 216 as a function of the steady state exotherm difference value, EXT_SS_EXD, the time constant of the temperature rise of the exotherm difference, TC_EXD, and BG_TMR according to the following relationship:

$$EXT\_EXD=(1-FK)*EXT\_EXD+FK*EXT\_SS\_EXD \qquad (26)$$

where,
- FK performs an exponential smoothing function according to the following relationship:

$$FK=1/[1+(TC\_EXD/BG\_TMR)] \qquad (27)$$

At 217 an instantaneous temperature value for the midbed point 42 at stoichiometric air/fuel is determined by first calculating a time constant value, TC_CMS, indicative of a temperature rise of the exhaust gas in the catalyst 32 in seconds according to the following relationship:

$$TC\_CMS=FN449(AM) \qquad (28)$$

where,
- FN449(AM) is a value obtained from a table, indexed by AM, and is indicative of a time constant, in seconds, of the change in catalyst midbed temperature due to a step change in instantaneous predicted exhaust flange temperature versus air mass (AM).

The instantaneous stoichiometric air/fuel temperature value, EXT_CMS, is then determined at 217 as a function of the steady state midbed temperature value, EXT_SS_CMS, the time constant of the temperature rise of the midbed, TC_CMS, and BG_TMR according to the following relationship:

$$EXT\_CMS=(1-FK)*EXT\_CMS+FK*EXT\_SS\_CMS \qquad (29)$$

where,
- FK performs an exponential smoothing function according to the following relationship:

$$FK=1/[1+(TC\_CMS/BG\_TMR)] \qquad (30)$$

At step 218 an instantaneous temperature value for the midbed point, EXT_CMD, is determined as a function of the instantaneous exotherm difference, EXT_EXD, and the instantaneous catalyst midbed temperature at stoichiometric air/fuel, EXT_CMS, according to the following relationship:

$$EXT\_CMD=EXT\_CMS+EXT\_EXD \qquad (31)$$

where,
- EXT_CMS and EXT_EXD are as previously described.

In an alternative embodiment, the instantaneous catalyst midbed temperature may be determined utilizing a temperature sensor.

Another exhaust component affected by the variable length of the exhaust pipe is the $NO_x$ trap 34, since its temperature is based on the midbed temperature of the catalyst 32. A steady state temperature drop, EXT_LS_NTR, between the catalyst midbed temperature 42 and the $NO_x$ trap midbed temperature 35 is calculated in a manner similar to that of temperature drop between the exhaust flange 28 and the exhaust gas inlet 36. EXT_LS_NTR is determined according to the following relationship:

$$EXT\_LS\text{-}NTR=FNXXA(AM)*[(EXT\_CMD+EXT\_NTR(\text{last}))/2\text{-}INFAMB\_KAM], \qquad (32)$$

where
- FNXXA(AM) is the temperature drop from catalyst midbed 42 to $NO_x$ trap 34 expressed in units of degrees of actual temperature drop per degrees of potential temperature drop, and EXT_NTR (last) is the value of the temperature of the $NO_x$ trap midbed 35 which was previously calculated.

Next, a steady state temperature of the $NO_x$ trap midbed 35 is calculated as a function of the catalyst midbed temperature, EXT_CMD, and of the steady state temperature drop between the catalyst midbed 42 and the $NO_x$ trap midbed 35, EXT_LS_NTR, as shown below:

$$EXT\_SS\_NTR=EXT\_CMD-EXT\_LS\_NTR \qquad (33)$$

Finally, an instantaneous temperature of the $NO_x$ trap midbed 35 is determined as a function of the steady state value according to the following relationship:

$$TC\_NTR=FNXXB(AM) \qquad (34)$$

where,
- FNXXB(AM) is a value obtained from a table, indexed by AM, and is indicative of a time constant, in seconds, of the rate of change in $NO_x$ trap midbed temperature due to a step change in the catalyst midbed temperature versus AM.

The instantaneous temperature value EXT_NTR is then determined as a function of the steady state NO_trap midbed temperature, EXT_SS_NTR, the time constant of the temperature rise of the $NO_x$ trap midbed temperature, TC_NTR, and BG_TMR according to the following relationship:

$$EXT\_NTR=(1-FK)*EXT\_NTR+FK*EXT\_SS\_NTR \quad (35)$$

where,

FK performs an exponential smoothing function according to the following relationship:

$$FK=1/[1+(TC\_NTR/BG\_TMR)] \quad (36)$$

While the best modes for carrying out the invention have been described in detail, those familiar with the art to which this invention relates will recognize various alternative designs and embodiments for practicing the invention as defined by the following claims.

What is claimed is:

1. A method for estimating a midbed temperature of a catalyst in an exhaust system of an internal combustion engine, the exhaust system including a variable length exhaust pipe having a short path and a long path for transporting exhaust gas from the engine to a catalytic converter, the exhaust system further including an exhaust valve positioned in the exhaust pipe for regulating the flow of exhaust gas between the short path and the long path, the method comprising:

sensing a rotational speed of the engine and generating a corresponding speed signal;

determining whether the exhaust gas is flowing through the short path or the long path;

determining an instantaneous temperature of exhaust gas at a first point on the exhaust pipe based on the speed signal; and determining an instantaneous temperature at a midbed point of the catalyst based on the instantaneous temperature of exhaust gas at the first point on the exhaust pipe and which path the exhaust gas is flowing.

2. The method as recited in claim 1 wherein determining the instantaneous temperature of exhaust gas at the first point comprises:

sensing a temperature of air flow into the engine and generating a corresponding air flow temperature signal;

determining a steady state temperature of exhaust gas at the first point when the engine is firing based on the speed signal; and determining a steady state temperature of exhaust gas at the first point when the engine is not firing based on the air flow temperature signal.

3. The method as recited in claim 2 wherein determining the instantaneous temperature at the midbed point comprises:

determining an instantaneous temperature of exhaust gas at an inlet of the catalytic converter based on the instantaneous temperature at the first point;

determining an instantaneous temperature of exhaust gas at the catalyst due to an exothermic reaction of the exhaust gas; and determining a stoichiometric instantaneous temperature at the midbed point at a stoichiometric air/fuel ratio.

4. The method as recited in claim 3 wherein determining the instantaneous temperature of exhaust gas at the inlet includes determining a steady state temperature drop between the first point and the inlet based on the flow signal.

5. The method as recited in claim 4 wherein determining the steady state temperature drop includes determining the steady state temperature drop according to the following:

$$EXT\_LS\_CIN=fn442\_tmp*[((EXT\_FL+EXT\_CIN(last))/2)-INFAMB\_KAM],$$

where EXT_LS_CIN corresponds to the steady state temperature drop, fn442_tmp is a value indicative of a temperature drop between the first point and the inlet as a function of the flow signal, EXT_FL corresponds to the instantaneous temperature of exhaust gas at the first point, EXT_CIN(last) corresponds to the previously determined value of the instantaneous temperature of exhaust gas at the inlet, and INFAMB_KAM corresponds to a value indicative of an estimate of ambient air temperature in degrees Fahrenheit.

6. The method as recited in claim 5 wherein determining the steady state temperature drop includes determining the value fn442_tmp according to the following:

$$fn442\_tmp=path\_wgt*fn442\_short(AM)+(1path\_wgt)*fn442\_long(AM),$$

where path_wgt corresponds to a value representative of the path flow of the exhaust gas, fn442_short(AM) corresponds to a temperature drop from the exhaust flange to catalyst inlet via the short path expressed in units of degrees of actual temperature drop per degrees of potential temperature drop, and fn442_long(AM) corresponds to the temperature drop from the exhaust flange to catalyst inlet via the long path expressed in units of degrees of actual temperature drop per degrees of potential temperature drop.

7. The method as recited in claim 3 wherein determining the instantaneous temperature of exhaust gas at the catalyst due to an exothermic reaction of the exhaust gas comprises:

comparing the instantaneous temperature at the midbed point to a second and third temperature threshold;

if the instantaneous temperature at the midbed point is less than the second temperature threshold, setting the instantaneous temperature of exhaust gas at the catalyst equal to zero; and if the instantaneous temperature at the midbed point exceeds the third temperature threshold, determining the instantaneous temperature of exhaust gas at the catalyst as a function of a steady state increase in the temperature of exhaust gas in the catalyst, and an exothermic reaction at an equivalence ratio of one corresponding to stoichiometric air/fuel ratio.

8. The method as recited in claim 7 wherein determining the stoichiometric instantaneous temperature at the midbed point in the catalyst at stoichiometric air/fuel ratio comprises:

comparing the instantaneous temperature at the midbed point to the second and third temperature thresholds;

if the instantaneous temperature at the midbed point is less than the second temperature threshold, setting the stoichiometric instantaneous temperature at the midbed point equal to the instantaneous temperature of exhaust gas at the exhaust gas inlet of the catalytic converter; and if the instantaneous temperature at the midbed point exceeds the third temperature threshold, determining the stoichiometric instantaneous temperature at the midbed point as a function of an exothermic reaction at an equivalence ratio of one corresponding to stoichiometric air/fuel ratio and the instantaneous temperature of exhaust gas at the exhaust gas inlet.

9. A system for estimating a midbed temperature of a catalyst in an exhaust system of an internal combustion engine, the exhaust system including a variable length exhaust pipe having a short path and a long path for transporting exhaust gas from the engine to a catalytic converter, the exhaust system further including an exhaust valve positioned in the exhaust pipe for regulating the flow of exhaust gas between the short path and the long path, the system comprising:

a sensor for sensing a rotational speed of the engine and generating a corresponding speed signal; and control logic operative to determine whether the exhaust gas is flowing through the short path or the long path, determine an instantaneous temperature of exhaust gas at a first point on the exhaust pipe based on the speed signal, and determine an instantaneous temperature at a midbed point of the catalyst based on the instantaneous temperature of exhaust gas at the first point on the exhaust pipe and which path the exhaust gas is flowing.

10. The system as recited in claim 9 further comprises:

a second sensor for sensing a temperature of air flow into the engine and generating a corresponding air flow temperature signal; and wherein the control logic, in determining the instantaneous temperature of exhaust gas at the first point, determines a steady state temperature of exhaust gas at the first point when the engine is firing based on the speed signal and a steady state temperature of exhaust gas at the first point when the engine is not firing based on the air flow temperature signal.

11. The system as recited in claim 10 wherein the control logic, in determining the instantaneous temperature at the midbed point, determines an instantaneous temperature of exhaust gas at an inlet of the catalytic converter based on the instantaneous temperature at the first point, determines an instantaneous temperature of exhaust gas at the catalyst due to an exothermic reaction of the exhaust gas, and determines a stoichiometric instantaneous temperature at the midbed point at a stoichiometric air/fuel ratio.

12. The system as recited in claim 11 wherein the control logic, in determining the instantaneous temperature of exhaust gas at the inlet, determines a steady state temperature drop between the first point and the inlet based on the flow signal.

13. The system as recited in claim 12 wherein the control logic determines the steady state temperature drop according to the following:

EXT_LS_CIN=fn442_tmp*[((EXT_FL+EXT_CIN(last))/2)−INFAMB_KAM], where EXT_LS_CIN corresponds to the steady state temperature drop, fn442_tmp is a value indicative of a temperature drop between the first point and the inlet as a function of the flow signal, EXT_FL corresponds to the instantaneous temperature of exhaust gas at the first point, EXT_CIN(last) corresponds to the previously determined value of the instantaneous temperature of exhaust gas at the inlet, and INFAMB_KAM corresponds to a value indicative of an estimate of ambient air temperature in degrees Fahrenheit.

14. The system as recited in claim 13 wherein the control logic determines the value fn442_tmp according to the following:

fn442_tmp=path_wgt*fn442_short(AM)+(1path_wgt)*fn442_long(AM), where path_wgt corresponds to a value representative of the path flow of the exhaust gas, fn442_short(AM) corresponds to a temperature drop from the exhaust flange to catalyst inlet via the short path expressed in units of degrees of actual temperature drop per degrees of potential temperature drop, and fn442_long(AM) corresponds to the temperature drop from the exhaust flange to catalyst inlet via the long path expressed in units of degrees of actual temperature drop per degrees of potential temperature drop.

15. The system as recited in claim 11 wherein the control logic, in determining the instantaneous temperature of exhaust gas at the catalyst due to an exothermic reaction of the exhaust gas, compares the instantaneous temperature at the midbed point to a second and third temperature threshold, sets the instantaneous temperature of exhaust gas at the catalyst equal to zero if the instantaneous temperature at the midbed point is less than the second temperature threshold, and determines the instantaneous temperature of exhaust gas at the catalyst as a function of a steady state increase in the temperature of exhaust gas in the catalyst and an exothermic reaction at an equivalence ratio of one corresponding to stoichiometric air/fuel ratio if the instantaneous temperature at the midbed point exceeds the third temperature threshold.

16. The system as recited in claim 15 wherein the control logic, in determining the stoichiometric instantaneous temperature at the midbed point of the catalyst at stoichiometric air/fuel ratio, compares the instantaneous temperature at the midbed point to the second and third temperature thresholds, sets the stoichiometric instantaneous temperature at the midbed point equal to the instantaneous temperature of exhaust gas at the exhaust gas inlet of the catalytic converter if the instantaneous temperature at the midbed point is less than the second temperature threshold, and determines the stoichiometric instantaneous temperature at the midbed point as a function of an exothermic reaction at an equivalence ratio of one corresponding to stoichiometric air/fuel ratio and the instantaneous temperature of exhaust gas at the exhaust gas inlet if the instantaneous temperature at the midbed point exceeds the third temperature threshold.

17. An article of manufacture for an exhaust system of an internal combustion engine of an automotive vehicle, the exhaust system including a variable length exhaust pipe having a short path and a long path for transporting exhaust gas from the engine to a catalytic converter and an exhaust valve positioned in the exhaust pipe for regulating the flow of exhaust gas between the short path and the long path, and automotive vehicle including a sensor for sensing a rotational speed of the engine and generating a corresponding speed signal, the article of manufacture comprising:

a computer storage medium having a computer program encoded therein for determining whether the exhaust gas is flowing through the short path or the long path, determining an instantaneous temperature of exhaust gas at a first point on the exhaust pipe based on the speed signal, and determining an instantaneous temperature at a midbed point of a catalyst positioned in the catalytic converter based on the instantaneous temperature of exhaust gas at the first point on the exhaust pipe and which path the exhaust gas is flowing.

* * * * *